United States Patent
Sinnott et al.

(12) 
(10) Patent No.: US 7,160,459 B1
(45) Date of Patent: Jan. 9, 2007

(54) IN-SITU BIOREMEDIATION FOR PETROLEUM CONTAMINATION

(75) Inventors: William Sinnott, Springfield, IL (US); Vince Smith, Springfield, IL (US); Jeff Wienhoff, Springfield, IL (US)

(73) Assignee: CW3M Company, Inc., Springfield, IL (US)

( * ) Notice: Subject to any disclaimer, the term of this patent is extended or adjusted under 35 U.S.C. 154(b) by 0 days.

(21) Appl. No.: 11/010,145

(22) Filed: Dec. 11, 2004

Related U.S. Application Data

(60) Provisional application No. 60/535,866, filed on Jan. 12, 2004.

(51) Int. Cl.
  *C02F 3/00* (2006.01)
(52) U.S. Cl. ............... 210/610; 210/922; 166/246; 435/262
(58) Field of Classification Search ........ 210/610–611, 210/631, 922; 435/262; 166/246
See application file for complete search history.

(56) References Cited

U.S. PATENT DOCUMENTS

| | | | | |
|---|---|---|---|---|
| 5,811,290 | A * | 9/1998 | Varadaraj et al. | 435/262.5 |
| 6,589,776 | B1 * | 7/2003 | Harkness | 435/262.5 |
| 6,884,351 | B1 * | 4/2005 | Lytal | 210/601 |

OTHER PUBLICATIONS

How to Evaluate Alternative Cleanup Technologies for Underground Storage Tank Sites, pp. X-9 to X-11, May 1995, U.S. Environmental Protection Agency.
Handbook on In Situ Treatment of Hazardous Waste-Contaminated Soils, Jan. 1990, p. 45, U.S. Environmental Protection Agency.

* cited by examiner

*Primary Examiner*—Chester T. Barry
(74) *Attorney, Agent, or Firm*—Alice O. Martin; Barnes & Thornburg LLP

(57) ABSTRACT

Methods and compositions provide site-specific bioremediation for petroleum contamination of soil and groundwater.

7 Claims, No Drawings

IN-SITU BIOREMEDIATION FOR PETROLEUM CONTAMINATION

BACKGROUND

This application claims priority from U.S. provisional application Ser. No. 60/535,866 filed Jan. 12, 2004.

Methods and compositions provide novel site-specific bioremediation for petroleum contamination of soil and groundwater.

Biological remediation techniques are used for some in-situ treatment of soils and groundwater contaminated with petroleum products. Bioremediation is the process of using microorganisms to naturally degrade contaminants into non-harmful elements, or elements that can be disposed of in accordance with regulatory criteria. The contaminants derived from a petroleum release are considered to be amenable to bioremediation. If the release is into the soil, petroleum-based contaminants, after being released into the soil, will migrate in several forms. The contaminants migrate downward by gravity toward the water table until the contaminants are trapped in pores as droplets, adsorb onto soil particles, dissolve in water, or reach an impermeable barrier.

In-situ bioremediation involves injecting a biomass, including microorganisms and associated nutrients, minerals and co-solvents, directly into the contaminated formation, either the soil contaminant plume, the groundwater contaminant plume, or both, in strategic locations determined based on geophysical site characteristics of the subsurface of the site. Due to the nature of the contaminated formation, the biomass, being in a slurry form, migrates laterally and vertically, depending on factors such as hydraulic conductivity, head pressure, and groundwater flow direction within the formation. After the slurry comes in contact with the contaminant, degradation begins.

The degradation of petroleum contaminants is achieved when ingredients of the slurry, plus nutrients from the environment, are transformed by the microorganisms into cell-building material and extra-cellular byproducts such as carbon dioxide and water.

The concentration of the individual indigenous microorganism strains and their relative percentages vary with the concentrations of pollutants in the soil and groundwater. The rate of biodegradation is proportional to the types and concentration of the bacteria available to do the work. Under normal conditions, the bacteria will double as frequently as every 15 to 20 minutes until they reach a population of several billion per gram of soil.

A site is suitable for bioremediation according to the industry if the petroleum contamination does not involve the required remediation of heavy metals, the contamination levels determined by analysis for Total Petroleum Hydrocarbons (TPH), are below 50,000 parts per million, the hydraulic conductivity of the site is greater than $10^{-7}$ centimeters per second (cm/sec), and the petroleum contamination results from fuel oil, diesel fuel, kerosene, or gasoline. Less refined petroleum products, such as lube oils or crude oil, are difficult to bioremediate. For a site where in-situ bioremediation appears to be a viable option, the first step is to perform a treatability study. (USEPA, 1995)

Although bioremediation is used in the art, costs need to be reduced. A source of high costs is considering more bacteria than are needed and not designing slurrys and injection systems that are site specific.

SUMMARY

Methods and compositions provide novel site-specific in-situ bioremediation for petroleum contamination of soil and groundwater to reduce costs and improve efficiency.

A method for bioremediating petroleum-based contamination at a suitable site that is treatable, includes the steps of:

(a) determining whether a site is treatable by collecting samples from the site by methods disclosed herein, analyzing the strains of microorganisms e.g. bacteria present, and analyzing plate counts; bacterial plate counts are preferably at least 100,000 CFUs per gram for soil; bacterial plate counts are preferably at least 10,000 CFUs per ml of groundwater;

(b) selecting a plurality of microbial strains found at the site; from 6–8 strains are generally sufficient;

(c) determining effectiveness of the plurality of strains at bioremediation of the site by comparing the plate counts of bacteria fed petroleum to plate counts of bacteria fed their preferred bacterial nutrients, e.g. sugars;

(d) designing an injection system to delivery a slurry to the site, wherein the slurry includes nutrients; and (e) monitoring the site to determine whether adequate numbers of microorganisms and sufficient nutrients are present; a first monitoring is preferably at 30 days as compared to industry practice which may be not until six months.

Monitoring the site bioremediation is by determining the carbon:nitrogen:phosphorus ratio. Monitoring is suitably conducted monthly for the first three months after the site is injected. Adjustments are made as needed, e.g. by adding nutrients and/or adjusting spacing of injections.

A slurry is designed to maintain a C:N:P ratio of between 100:10:1 and 100:1:0.5, where C=carbon, N=nitrogen, and P=phosphorus. Nitrogen and phosphorus are matched to the carbon amounts. The upper range is what the slurry is designed to achieve.

Plume: a space in water or soil containing pollutants released from a point source.

Slurry: a suspension of insoluble particles usually in water.

DETAILED DESCRIPTION

Although bioremediation is known in the art, the specific forms of bioremediation disclosed herein are novel. The specific procedures for conducting a treatability study, an injection system design, a batch formulation and mixing, and a monitoring scheduling and parameters form the basis for a unique form of bioremediation which has proven successful at remediating petroleum-based contamination at sites which have met the initial screening criteria for treatability.

A. Treatability

For a site where in-situ bioremediation appears to be a vaiable option for remediation based on criteria in the (USEPA, 1995), the first step is to perform a treatability study. The use of a treatability study is known. However, the sampling (numbers of samples and sampling locations) as well as the components selected for testing varies widely. The protocols listed in items 1 and 2 herein are believed to be the minimum (on a cost basis) amount of testing required to provide enough information to make a determination as to the effectiveness of this method of bioremediation. Item 3 is important but is not directly related to cost reduction. Additional sampling or additional parameters would provide additional information, but are not necessary. The treatability study includes the folllowing steps:

1. A soil and a groundwater sample is collected from (a) the most contaminated area of the site, and (b) near the edge of the contamination.

The soil samples are obtained from the depth at which the highest level of contamination was determined, typically just above the groundwater level, if groundwater is found at a depth not greater than 20 feet. Existing groundwater monitoring wells are suitable and provide the groundwater samples. The sampling locations may be different for the soil and groundwater, because the individual plumes are not identical. The soil plume is generally smaller and contained within the groundwater plume.

If only soil contamination is present, then only soil sampling is required. If only groundwater contamination is present, then both soil and groundwater samples are necessary. Soil samples are obtained from the approximate depth of the highest levels of soil contamination found, typically at the depth of the groundwater table.

2. The samples are transported to an experienced laboratory for aerobic treatability testing to determine the presence and quantities of indigenous bacteria present to degrade the material, which information is needed to determine the most effective nutrient blend for the site. The soil and groundwater samples are also tested for pH, zinc, iron, copper, nitrate, nitrite, and phosphorus levels, and total organic carbon content. The soil samples are tested for moisture content.

Initially, aerobic heterotrophic plate counts are conducted on each sample. After the counts and the approximate percentage of each strain types are determined, approximately seven of the strains found among the samples are selected for identification and endpoint assay, although other numbers may be suitable depending on the nature of the site, e.g. 6–8. The endpoint assay determines each selected strain's individual ability to digest the petroleum contaminant, versus the introduction of a food source known to provide good bacterial growth. The petroleum contaminant (or contaminants) are used to test each of the selected strains ability to digest petroleum hydrocarbons.

Generally, effectiveness of microorganisms in bioremediating sites with petroleum contamination is predicted by testing bacteria in three environments and comparing the results:

(a) basic nutrient media;
(b) regular nutrient media and petroleum;
(c) basic nutrient media supplemented by nutrients preferred by bacteria e.g. sugars.

The use of "approximately seven" strains has provided a good balance between cost and useful information. Typically the standard laboratory fees for this part of the study include the identification and endpoint assay of between six and eight strains, based on the capacity of their particular equipment. Adding more strains to the test requires the laboratory to use two machines, and the costs for this portion of the test nearly double. Six to eight strains tested provides adequate information to use in the final determination of the viability of bioremediation.

If more than seven strains are found, the selection of strains for the endpoint assay involves an elimination process. First, the strains which are present in the highest percentage from each sample are included. The second round of selection balances the following two factors:

A. The soil and water samples taken from the high contamination area of the site contain bacteria that can tolerate the contamination; therefore, as many strains as possible from them should be included. The limit is a practical one dictated by cost.

B. Bacterial strains comprising the maximum percentage in each of the samples should be included.

The identification and endpoint assay provides two valuable sets of results, the names of the bacteria found, and the likelihood that each can digest the particular type of contamination present. The results of the endpoint assay categorize the ability of each strain analyzed.

Based on the results of the plate counts, the endpoint assays, and the nutrient testing, the determination is made whether the indigenous bacteria will be effective at bioremediation at the site.

3. The results of the treatability study are analyzed first by reviewing the plate count results. A result greater than 1,000 Colony Forming Units (CFUs) per gram (for soil) or per milliliter (mL) (for groundwater), especially from the samples with the highest level of contamination, indicates a good likelihood that in-situ bioremediation will be successful. Next, the number of different strains found throughout the samples, and their relative percentages are reviewed. The more strains found, the greater the chances of success. If fewer than four distinct strains are found amongst the four samples, the likelihood of success is reduced.

If the iron content in the groundwater samples is much greater than 20 parts per million (ppm), then bioremediation may not be effective. Generally, if one or more of the analyzed metals, iron, zinc, and copper, have high concentrations, then the bacterial counts for all four samples will be below the 1,000 CFUs limit discussed above.

The pH of all of the samples should be in the range of 6 to 8. The farther the average pH of the samples is away from this range, the less the likelihood of success. If the pH is out of range, then the plate counts will usually be unfavorable. The ideal pH level is 7.0, although certain types of bacteria favor slightly acidic or basic conditions (USEPA, 1990).

The endpoint assay information, reviewed in context with the plate counts and percentages of each strain, provides additional assurance of the viability of in-situ bioremediation. The plate counts are important factors, as are the percentages of each strain. The endpoint assay information can be used to supplement the other information. If the plate counts are acceptable, and the percentages of each strain show a good biodiversity of bacterial types, then the results of the endpoint assay should identify the bacterial strains capable of remediating the contamination. Reviewing the endpoint assay by itself may lead to false conclusions, for instance, the identification of bacteria strains which are successful at digesting the contaminant does not guarantee success, because other factors may limit their populations. Similarly, the identification of no bacterial strains which are successful at digesting the contaminant does not mean that bioremediation will not work. The "success" rating system is based on comparison to a known food source for bacteria. High bacteria counts will more than offset a "poor" rating.

Selection of the plurality of bacteria is made by e.g. favoring bacteria in a "hot" that is, highly contaminated point. Bacterial strains which are at least 50% of the microbial population from each of the four samples (two from water, two from soil) are candidates for selected strains for endpoint assay analysis.

If the results of the treatability study are favorable, the next step is to design a site-specific injection system.

B. Injection System Design

The injection system is designed so that the injected slurry can reach the farthest point of the site to be treated within 120 days, preferably less than 90 days. Results are expected within 30 days after injection. The system may be designed for gravity feed or pressure feed.

The injection system contains surface injection points consisting of wells, pits, or trenches to deliver the slurry to the formations in the site which contain the contamination. The selection of which type of system depends upon factors which include (a) the depth from surface to contamination, (b) the disruption of the site during installation, (c) the hydrogeology of the site, and (d) future plans for the site.

Injection wells are used if minimal site disruption is a concern, and if hydraulic conductivity of the site is high. Trenches are suitable if future plans for the site are redevelopment, because the number of injection points is less than a week. Trenches are also better than injection wells for sites that have lower hydraulic conductivities. Injection pits, i.e. drilled or excavated areas backfilled with porous stone, offer a compromise between the two methods. Frequently, a combination of systems are used.

The following calculations are used to determine the design and adequacy of injection system spacing:

Hydraulic Conductivity=K=feet/second (ft/s)=field determined

Driving Force=$\Delta h$=average depth to contamination for gravity systems, or hydraulic head for pressure systems=feet Length=$\Delta 1$=½ distance from injection system to injection system=feet Soil Porosity=(unitless) laboratory determined Specific Discharge=q=K$\Delta$h/$\Delta$1=ft/s Velocity=V=q/n=ft/day Days for microbes to travel $\Delta l=\Delta 1/V$=days Using these formulas, as in Example 2 various combinations of length (spacing) and driving force (gravity or pressure feed) can be tested. The final result is a system that requires less than 120 days for the microbes to travel. For a site with varying hydraulic conductivities, the most conservative value (the lowest hydraulic conductivity) is used for the calculation. For a site where it is known that the hydraulic conductivity in one area is distinctly different than another, such as granular fill commonly used to backfill around underground tanks, the calculations are repeated to minimize the spacing of the systems. Parameters are adjusted until the goal of less than 120 days is achieved.

Injection systems include injection wells, typically 4-inch or 6-inch diameter wells with 10-foot well screens, set at the depth where approximately 2 feet of the screen is submerged. Another injection system is injection sumps, wherein pits are drilled or excavated to the depth of the contamination, then backfilled with septic gravel or other highly permeable material. Injection trenches, basically linear sumps, are also suitable. Injection pits and injection trenches have injection points (access points) installed at ground level. The access points typically are 4-inch or 6-inch pipes which extend to near the bottom of the pit or trench. The spacing of wells, pits, or trenches are determined by the calculations disclosed herein. Injection points are not suitable as sample locations because the high levels of nutrients added at those locations may not provide representative samples.

The injection system preferably extends to the edges of the plume. This technique helps prevent spreading the contamination beyond the original plume boundaries. As the site is remediated, the injections focus on the areas of highest remaining contaminant concentrations, that is less of the slurry is added to the perimeter, and more is added to the center of the plumes. Initially, equal amounts of slurry are added to each injection point.

After the injection system is designed and installed, the first slurry injection is prepared and installed. The design and installation details are presented herein. Following the initial slurry injection, monitoring of the site for results begins.

C. Monitoring

Changes in the C:N:P ratio should occur immediately after inoculation. If necessary, adjustments are made by adding more slurry or using other spacing.

Remediation monitoring is preferably conducted monthly for the first three months, then quarterly until the contamination is remediated, or another remediation technology is implemented. The first monitoring event is preferably conducted approximately one month following the first injection. Depending upon the results of the first monitoring event, the second inoculation is conducted before the second monitoring event, or between the second and third monitoring events. If the results of the first monitoring event have bacterial counts greater than 10,000 CFUs, and nitrogen levels are greater than 10 ppm, then the second inoculation is preferably conducted following the second monthly monitoring event; otherwise it should precede the second monthly monitoring event.

The first three monthly monitoring events ascertain data from the first inoculation(s) in order to assure that adequate bacteria counts and nutrient levels are achieved as soon as possible.

Monitoring includes the steps of obtaining a soil and a groundwater sample from the most contaminated area of the site, as well as a soil and a groundwater sample from near the edge of the contamination, the same sample locations used for the treatability study. The soil and groundwater are also tested for aerobic heterotrophic plate counts, nutrients, pH, and remaining contamination levels. These results are used to determine the timing of, and constituents needed for, subsequent inoculations, or determining when remediation has been completed. Completion is achieved when the contamination no longer presents a hazard, generally when sampling reveals that levels have fallen below clean-up objectives.

Although plate counts exceeding 1,000 CFUs per gram (or mL) are acceptable, counts of at least 100,000 CFUs per gram for soil, or 10,000 CFUs per mL for groundwater are preferred.

The most recent laboratory monitoring results form the basis to determine the next slurry injection formulation. The results of the contaminant levels are used to determine the current carbon content, while the nitrate and nitrite levels determine the nitrogen content, and the phosphorus and pH levels are also used. If the plate counts exceed 1,000 CFUs per gram (or mL), but the nitrogen level is low, then an inoculation is prepared to adjust the carbon:nitrogen:phosphorus (C:N:P) ratio. If the C:N:P ratio is acceptable, but the plate counts are low, then an injection of micronutrients is prepared. If the plate counts are low and the C:N:P ratio is out of range, an inoculation is prepared to adjust the C:N:P ratio. Typically, the plate counts are acceptable if the C:N:P ratio is acceptable. Generally, adjustments to achieve or maintain this ratio are not made by adding microorganisms, but by adjusting nutrients made in the slurry, or adding more slurry, or altering spacing of injections.

D. Slurry Design

The C:N:P ratio should be maintained between 100:10:1 and 100:1:0.5. The upper range (100:10:1) of the ratio is what the slurry is designed to achieve. Commercially available fertilizers can be used to increase the nitrogen and phosphorus levels. In reality, a site is generally found to be extremely nitrogen deficient until injections begin. The nitrate level of the nitrogen product(s) used is checked to assure that an injection would not contaminate the groundwater with nitrate. In many cases, this will limit the amount of nitrogen that can be added to the site at a given time. Smaller doses conducted more frequently appear to be more effective initially to get the ratio within the appropriate range. Liquid products are preferred for ease of mixing, but granular products can be used. Slow-release granular products are very useful at increasing the overall nitrogen content without causing a nitrate level concern. The site's carbon levels (contaminant levels), nitrogen levels, and phosphorus levels are obtained from the most recent laboratory analysis.

In order to determine the required nitrogen or phosphorus, first the existing C:N:P ratio is determined from the most recent available monitoring data. The units used in the ratio are irrelevant, so long as they are the same for each component. Typically the units are parts per million or parts per billion. The carbon level is multiplied by 0.1 to determine the optimal nitrogen level, and by 0.01 to determine the optimal phosphorus level. The existing nitrogen level is subtracted from the optimal nitrogen level to determine the level of nitrogen needed. This value is converted to pounds using the volume of contamination and the unit weight of the soil at the site. Similarly, the existing phosphorus level is subtracted from the optimal phosphorus level to determine the level of phosphorus needed. This value is converted to pounds using the volume of contamination and the unit weight of the soil at the site The results of these calculations are then used to blend the appropriate slurry. For example: if 500 pounds of nitrogen is needed in the slurry, and 28% nitrogen fertilizer is used, 500/0.28=1786 pounds of 28% nitrogen fertilizer.

The volume of each slurry injection is based on previous experience at that site. Lacking previous experience, information derived from similar sites is used. The more volume used for each injection, the better the results. The upper limit is exceeded if mounding of the groundwater causes the accumulation of water on the ground surface, or problems with nearby basements flooding. Groundwater mounding equations can be used to check for this concern.

The use of Newton's Method to solve the following simultaneous equations verifies delivery of nutrients and water required for remediation (number of hours for the inoculation, at the flow rate in gallons/minute, and at a given pressure I pounds per square inch).

$$Z_m = \frac{Q}{4\pi KH}[3 - \Upsilon - J(r) - \ln\mu \quad (1)$$

$$H = d_0 + 1/2 Z_m \quad (2)$$

$$\mu = \frac{L^2 S}{16 KHt}(1 + 1/r^2) \quad (3)$$

Where:
Q=Average flow rate of water with nutrients injected into the field
K=Horizontal hydraulic conductivity (cm/s)
$d_0$=Natural depth of the Saturated Zone (ft)
$\gamma$=Euler's Constant (0.577)
S=Specific Yield (0.15)
t=time of water flow with nutrient
L=Length of infiltration zone (ft)
W=Width of Field (ft)
$\mu$=Viscosity of Fluid (1.0)
r=Radius of Influence=L/W
J(r)=Influence of Radius r
$Z_m$=mounding height Typically, the injection system itself limits the quantity of slurry that can be injected at one time. If there is any doubt about the quantity of slurry that can be injected at one time (typically one work day), then the slurry is prepared using a minimal amount of water, less than 200 gallons, so that the "active" ingredients, oxygen, nitrogen, phosphorus, and micronutrients, can be injected. Following the injection of the "active" ingredients, a second batch using water only can be used to finish the single treatment the same day. The addition of water helps to push the "active" ingredients away from the injection points, treating additional area beyond the injection system.

The frequency of slurry injection is also based on previous experience at that site. Generally two initial injections, spaced about a month (maybe two) apart, are very effective at achieving the desired bacterial populations quickly. Following the initial injections, injections are conducted quarterly for the remainder of the first year, then semi-annually thereafter. The monitoring results are reviewed to determine the actual schedule. If the C:N:P ratio is shown to be approaching or below the lower range of 100:1:0.5, an injection should be conducted. If the ratio approaches or goes over the upper range of 100:10:1, then injections should be postponed until the ratio is below or approaches 100:1:0.5.

In order to effectively treat the entire site, the hydraulic conditions at the site and the type of injection system used will also affect the quantity and frequency of slurry injections. Sites with a shallow groundwater table require smaller, typically 500 to 1,000 gallon injections, more frequent injections, typically 2 injections one or two weeks apart, than those with a deeper depth to groundwater. Sites with lower hydraulic conductivities require smaller, more frequent injections, than sites with higher hydraulic conductivities. Injection systems relying on injection wells require smaller, more frequent injections than sites which use injection sumps or trenches.

Nitrogen is the single most important factor in this system. The bacteria use the nitrogen to metabolize the carbon in petroleum contamination. In designing an injection slurry, always attempt to approach the upper range of the carbon:nitrogen:phosphorous ratio when adding nitrogen. Phosphorus is added on occasion, but nitrogen will almost always be included. If analytical results show unacceptably high levels of nitrogen in one area, they can be diffused by an injection of slurry without nitrogen.

Micronutrients, and other biological stimulants, including calcium sulfate, are added to a slurry where the bacterial population is very low, or not responding adequately. These products are available commercially from environmental specialty manufacturers, and can be added at the rates up to those suggested by the manufacturer. These products can be included with or without the addition of bacteria.

The dissolved iron concentration in the groundwater is preferably below 20 parts per million. For sites where the iron concentration approaches or slightly exceeds this level, metal chelating agents, commercially available for swimming pool use, can be used to reduce the fouling of the injection system caused by the iron creating deposits in the system.

The slurry is aerated prior to injection to maximize the oxygen content, because oxygen is the preferred chemical to achieve bacterial growth. The dissolved oxygen content in fully-aerated 21° Celsius water is approximately 9.0 mg/L, which is equal to approximately 0.008 pounds of available oxygen per pound of slurry. Aeration is a free byproduct of mixing the slurry with a circulation pump that increases the exposure of the slurry to the air. For every three pounds of oxygen provided to the subsurface, one pound of hydrocarbon contamination is removed (USEPA, 1995).

A suitable pH of the soil and groundwater is between 6 and 8. If the analytical results indicate that the site pH is out of range, then the slurry can be pH adjusted to bring the site into range. Otherwise, the slurry should be pH balanced to between 6 and 8 prior to injection. Chemicals intended for use in swimming pools to adjust the pH may be used to accomplish this. If a site has a pH higher than 8, use pH minus to lower the slurry to a pH of 6. Likewise, if the site has a pH lower than 6, use pH plus to raise the slurry to a pH of 8.

A suitable procedure for preparing the slurry is to add the fertilizer (nitrogen and phosphorus products) to the initial quantity of water, then micronutrients, bacteria, chelating agents, and pH adjusters, in that order. The slurry is mixed throughout the preparation process. Mixing is best achieved with a pump which draws from the bottom of the container and returns the mixture to the container by releasing it into the air above the level of the mixture. Any dry components should be added slowly to assure proper dispersion throughout the slurry. Mixing is not necessary in transit to the site, but mixing should be repeated at the site immediately prior to injection.

EXAMPLES

Example 1

Slurry Design

The following is a slurry design based on the results of a treatability study indicating that the average contaminant level for the site is 48 parts per million, the average pH is 7.23, the nitrogen level is below detection, and the phosphorus level is 4 parts per million. The area contaminated is 18,000 square feet, and the thickness of contamination is 8 feet. The soil density is 110 pounds per cubic foot.

Ideally, the nitrogen level should be: 48×0.1=4.8 parts per million

Ideally, the phosphorus level should be: 48×0.01=0.48 parts per million

Because the phosphorus level is above the ideal, no phosphorus is needed. The level will be reduced as bioremediation occurs.

The total weight of the contamination plume is: Area×Depth×Density=(18,000 square feet)×(8 feet)×(110 pounds per cubic foot)=15,840,000 pounds The nitrogen required is: (15,840,000 pounds)×(0.000048)=760.32 pounds Assuming 32% liquid nitrogen is available, the slurry needs: 760.32/0.32=2,376 pounds of 32% nitrogen.

In this case, the slurry contains 2,376 pounds of 32% liquid nitrogen, micronutrients prepared according to the manufacturer's directions, and the balance is water. The pH of the liquid nitrogen is obtained from the supplier, in anticipation that the pH of the slurry may need to be adjusted to approximately 7.0. After-mixing a slurry, the pH is tested to assure that it is near the desired level, but pH is between 6.0 and 8.0.

The initial batch consists of the nitrogen, micronutrients prepared according to the manufacturer's directions, and enough water to bring the total volume to about 500 gallons. After mixed, aerated and brought to the site, if the injection system readily accepts the 500 gallons, then a second "batch" consisting of 1,500 gallons of water can be purchased locally, taken to the site, aerated, and injected as needed. If the site does not accept the entire 2,000-gallon initial injection, the total volume added is recorded, so that the information can be used for subsequent inoculations. Should the site accept the entire 2,000 gallon injection, then assume 2,500 gallons for the next injection. Unless the site is very large, injections over 2,500 gallons should not be necessary. The mounding calculations, especially with higher volume injections, or nearby basements, is checked.

The initial injection, and sometimes the first several injections, can be frustrating until enough site-specific experience is gathered to achieve the desired result in a reasonable timeframe. Unless a site is exceptionally large, an injection is conducted within a single day. Seasons may also affect the timing and volume of injections. Following periods of heavy rainfall, the quantity of an inoculation may need to be reduced. During freezing weather, inoculations are difficult to conduct, but winter inoculations may be avoided by conducting inoculations in the fall.

Example 2

Testing a Gravity Fed Injection Well System for a Particular Site.

The following is an example of the calculations prepared to test a gravity fed injection well system for a particular site. The depth to contamination was approximately 9 feet, the depth to groundwater at the site.

Hydraulic Conductivity=$K=1.00\times10^{-4}$ centimeters/second=$3.29\times10^{-6}$ feet/second Driving Force=$\Delta h$=average depth to contamination=9 feet Length=$\Delta l$=½ distance from injection well to injection well=50 ft/2 =25.0 feet Porosity=35.0% or 0.35

Specific Discharge=$q=K\Delta h/\Delta l=(3.29\times10^{-6}$ ft/s)(9 ft/25.0 ft)=$1.18\times10^{-6}$ ft/s Velocity=$V=q/n=(1.48\times10^{-6}$ ft/s)/0.350=$4.22\times10^{-6}$ ft/s=0.365 ft/day Days for microbes to travel $\Delta l=\Delta l/V=25.0$ ft/0.365 ft/day=68.4 days Because the calculation results verify a travel time of less than 90 days, injection wells at the site are set on 50-foot centers.

DOCUMENTS CITED

USEPA, 1990. Handbook on In Situ Treatment of Hazardous Waste-Contaminated Soils, United States Environmental Protection Agency, Publication EPA/540/2-90/002, January 1990.

USEPA, 1995. How to Evaluate Alternative Cleanup Technologies for Underground Storage Tank Sites, United States Environmental Protection Agency, Publication EPA-510-B-95-007, May 1995.

We claim:

1. A method for bioremediating petroleum-based contamination at a suitable site that is treatable, the method comprising:
   (a) analyzing indigenous bacterial strains;
   (b) selecting a plurality of bacterial strains found at the site for identification and endpoint assay;
   (c) determining effectiveness of the plurality of strains at bioremediation of the site wherein effectiveness for each selected strain is determined by comparing plate counts of bacteria fed petroleum to plate counts of bacteria fed their preferred nutrients;
   (d) delivering a slurry to the site by injection;
   (e) monitoring the site to determine whether a suitable C:N:P ratio is in the site; and
   (f) if the ratio is not suitable, adjusting step d until contamination is bioremediated or another bioremediation technology is implemented.

2. The method of claim 1 wherein the plurality is seven strains.

3. The method of claim 1 wherein monitoring is conducted monthly for the first three months after injection of the site by analysis of bacterial plate counts and C:N:P ratios.

4. The method of claim 3 wherein in the monitoring step, suitable bacterial plate counts are at least 100,000 CFUs per gram of soil.

5. The method of claim 3 wherein in the monitoring step, suitable bacterial plate counts are at least 10,000 CFUs per ml groundwater.

6. The method of claim 1, wherein the slurry comprises a nutrient blend and maintains a ratio within the site of carbon:nitrogen:phosphorus of 100:10:1, and wherein the slurry is based on contaminant levels and bacterial colony plate counts.

7. The method of claim 6 wherein nitrogen and phosphorus levels are adjusted by using fertilizer in the slurry.

* * * * *